United States Patent

[11] 3,603,924

[72] Inventor Forest K. Harbert
 10 Highland Avenue, Torrens Park,
 Australia (5062)
[21] Appl. No. 823,031
[22] Filed May 8, 1969
[45] Patented Sept. 7, 1971

[54] STOP-WARNING DEVICE FOR VEHICLES
 9 Claims, 13 Drawing Figs.
[52] U.S. Cl. ..................................................... 340/52,
 340/54, 340/74
[51] Int. Cl. ..................................................... B60q 1/44
[50] Field of Search ........................................... 340/79, 74,
 54, 52

[56] References Cited
 UNITED STATES PATENTS
 1,274,420 8/1918 Henry .......................... 340/54
 1,584,909 5/1926 Guilder ........................ 340/74 B
 1,970,252 8/1934 Rydner ......................... 340/79
 2,111,931 3/1938 Howard ........................ 340/54

Primary Examiner—John W. Caldwell
Assistant Examiner—Glen R. Swann, III
Attorney—Ancel W. Lewis, Jr.

ABSTRACT: A safety device for vehicles employs a positive warning member visibly displaying the work "Stop" to enable the driver of a vehicle to warn others that the driver intends to stop or is already stopped. A control for the warning member functions independently of existing brake lights but in conjunction with the existing equipment of the vehicle such as the foot brake pedal or hand brake lever and is operational to be turned on by a second actuator only when one of the brakes are first actuated and stays on until the brakes are released.

PATENTED SEP 7 1971

INVENTOR.
Forest Keith Harbert
BY

*Ancel W. Lewis Jr.*

ATTORNEY

INVENTOR.
Forest Keith Harbert
BY

*Ancel W. Lewis Jr.*
ATTORNEY 3,603,924

1

STOP-WARNING DEVICE FOR VEHICLES

BACKGROUND OF THE INVENTION

This invention relates to vehicle safety devices and more particularly to a novel positive stop warning device for vehicles.

Safety on the highways is of increasing concern as the number of collisions between vehicles progressively increases. More safety features have recently been incorporated into vehicles and particularly automobiles in an effort to reduce the likelihood of these collisions. One particular hazard on the highway is when a vehicle is stopped or standing. Present day vehicles and particularly motor vehicles utilize a brake light and reflector lens in the tail light section on the vehicle which is arranged to momentarily go on when the brake pedal is depressed and turn off when the brake pedal is released. This type of warning provides a degree of safety but there remains a good deal of uncertainty to others including trailing vehicles as to whether or not a particular vehicle is going to actually reach a complete stop or whether or not it has already completely stopped.

Accordingly, it is an object of the present invention to provide a novel positive stop-warning device for vehicles which enables the driver to alert others such as the driver of a trailing vehicle of his intention to completely stop or that his vehicle is already stopped.

Another object of this invention is to provide a stop-warning device which is readily applied to a variety of types of conventional vehicles such as motor vehicles, motor bikes, trailers, tractors, machinery, earth-moving equipment and the like.

Yet a further object of this invention is to provide a stop-warning device independent of the existing brake lights which is usable with the already existing equipment on the vehicle such as the foot brake pedal and hand brake lever and is actuated by a slight movement of a second actuator such as a lever mounted on the steering column.

SUMMARY OF THE INVENTION

In accordance with the present invention I provide one or more stop-warning members for visibly displaying the word "Stop" to be mounted externally of a vehicle which will upon activation indicate a definite intention of a driver to stop the vehicle or that the vehicle is already stopped. The control is readily accessible to the driver and includes one control portion associated with the existing equipment such as the brakes and preferably the brake pedal and hand lever and another separate control portion cascaded with the first control portion to turn the warning member or members on only after the brakes have been applied and turn them off when the brakes are released. Other objects, advantages and capabilities of the present invention will be more apparent as the description proceeds taken in conjunction with the accompanying drawings, in which:

DESCRIPTION OF THE PREFERRED EMBODIMENTS

Figure 1:
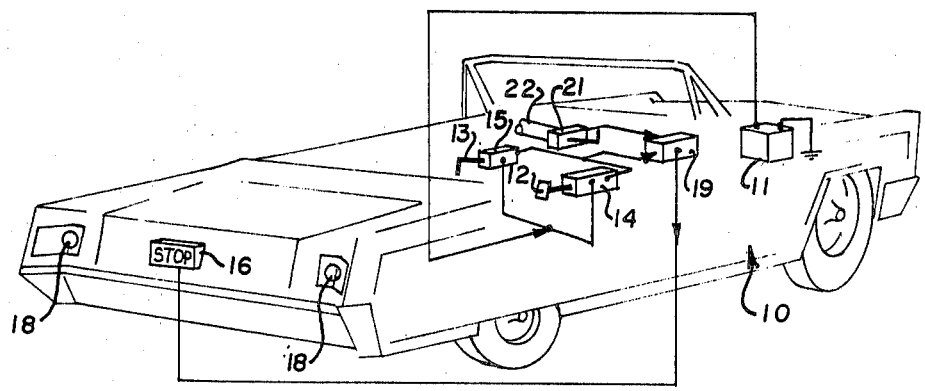
FIG. 1 is a schematic block diagram of a positive stop signal device for vehicles embodying features of the present invention as it may relate to a typical automobile.

Referring now to the drawings a positive stop-warning device embodying features of the present invention and its relationship on a motor vehicle 10 will first be described generally with reference to FIGS. 1 and 2 followed by a more detailed description of the typical components incorporated therein illustrated in FIGS. 3–13 with like parts bearing similar reference numerals where applicable.

The embodiment shown preferably uses the existing battery 11 as the source of electric power and the existing foot brake pedal 12 and hand brake lever 13 as manually settable driver-actuated structure incorporated into the control as described hereinafter. The typical motor vehicle also has a normally open brake switch 14 already existing in the tail light circuit which is closed when the brake pedal 12 is depressed. In addition, there is provided a normally open electric switch 15 which is readily attached to or mounted on the hand brake lever 13 such as a plunger type electric switch which is closed when the hand brake level 13 sets the brakes. Brake switches 14 and 15 are connected in parallel with one another and across the active or nongrounded side of the battery 11 so that together they selectively control the electric power from the battery 11. The other side or electrode of the battery is connected to an electric ground such as to the vehicle body as are the other electric grounds hereinafter described.

A stop-warning member generally designated by numeral 16 including an electric lamp or bulb 17 energizable by the battery 11 is arranged to be mounted at a readily visible location on the vehicle such as centrally of the trunk lid where it is clearly visible to a trailing driver. However it is understood that one or more additional warning members 16 may be incorporated in the device connected in parallel to one another and located at other places on the vehicle such as on the front end. As shown the stop-warning member 16 is physically separated from the usual brake lights 18 in the tail light section of the vehicle. In the control for selectively regulating the power from the battery to the stop-warning member 16 there is provided a relay 19 which in turn is set or regulated by a control switch assembly 21; the relay 19 and control switch assembly 21 being shown as separate structures for adaptation to the vehicle but taken together form a separate control portion or separate actuator in the control circuit. The control switch assembly 21 is adapted for mounting on the steering column 22 or instrument panel of the vehicle so as to be readily accessible to the driver and has a hand actuator or lever 23 and for actuation by the driver as described hereinafter.

Figure 2:
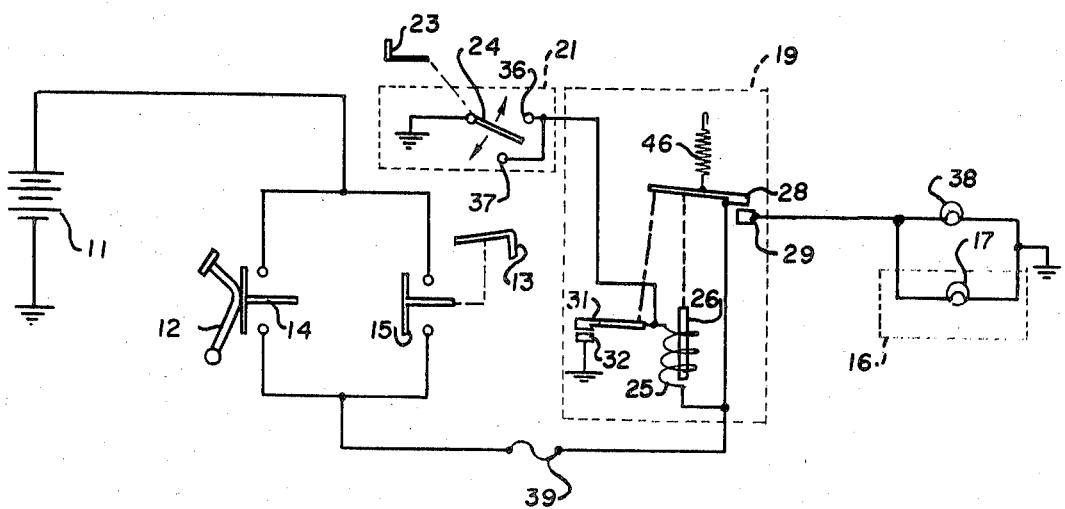
FIG. 2 is a schematic electric circuit diagram of the device shown in FIG. 1.
Figure 3:
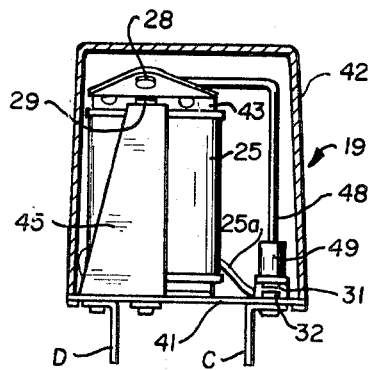
FIG. 3 is an end elevation view of a relay incorporated into the device of FIGS. 1 and 2 with the cover broken away to show interior parts.
Figure 4:
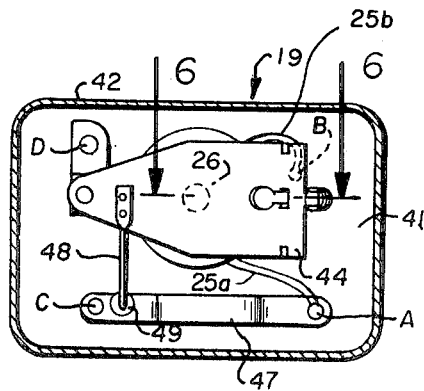
FIG. 4 is a top plan view of the relay of FIG. 3 with the cover broken away.
Figure 6:
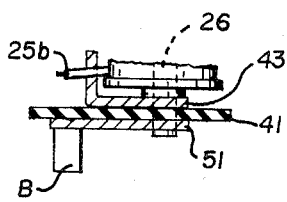
FIG. 6 is a fragmentary elevation view of the relay showing a portion of the side opposite that of FIG. 5.

As shown schematically in FIG. 2, relay 19 has a coil 25 wound on a core 26 together with a set of normally open line contacts 28 and 29 and a set of normally open, hold-in contacts 31 and 32; said sets of contacts being operatively associated with the coil 25 to close simultaneously upon the energization of the coil. The control switch assembly 21 has a movable contact 24 responsive to the setting of the lever 23 and a set of spaced-apart, stationary electric contacts 36 and 37 electrically connected together against which the movable contact 24 may be moved by actuation of lever 23.

Coil 25 is connected in a series circuit with control switch 21 which has its movable contact 24 connected to ground and its stationary contacts 36 and 37 connected to the coil. This series circuit is connected in parallel with the brake switches 14 and 15 and battery 11 so that the battery will energize the coil only when one of the brake switches is closed and movable contact 24 is moved to engage either of its electric contacts 36 or 37. The line contacts 28 and 29 are in series circuit with the brake switches, and warning light bulb 17 to connect the active side of the battery to the light bulb 17 when closed. The hold-in contacts 31 and 32 are connected between the coil 25 and switch 21 and ground to close and bypass switch 21 to keep the light 17 on until the brake switch which has been closed is again opened. A driver indicator light bulb 38 is also connected to the line circuit through contacts 28 and 29 and to ground as is light bulb 17. Additional warning bulbs will each be connected to contact 29 across bulbs 17 and 38. A line fuse 39 is provided in the active line ahead of the coil 25 and contacts 28 and 29 for overload protection purposes.

Briefly then, the operation of the above-described vehicle device, in sequence, is that when the vehicle is moving and the driver intends to warn another vehicle that he is going to stop the foot pedal 12 will be applied to close switch 14 and the control lever 23 becomes set or operational. The moving of the lever 23 so that the associated contact 24 engages either of contacts 36 or 37 will then result in completing the live or active side of the battery to the warning light 17 and driver indicator bulb 38 will be illuminated indicating to a trailing driver or the like that the driver of the vehicle which is carrying the device intends to stop. When the vehicle is standing or stopped the control switch lever 23 will become operational preferably by applying the hand brake 13 but the foot brake may also be used. In this manner the actuation of the lever 23 will not turn on the light 17 until one of the brake switches are first closed and in turn applying the foot or hand brake will not by itself operate the bulbs 17 and 38. Once the warning bulb 17 is on it remains on until the brake switch which has previously closed is opened.

A preferred form of relay shown in FIGS. 3-6 has a base 41 of insulator material such as a fiber board with a removable cover 42 of a metal or the like for access to the various parts therein. The coil 25 and core 26 are supported on an L-shaped frame 43 of a conductive material secured to the base. An upper armature 44 of a conductive material carries line contact 28 and an upright member 45 of a conductive material carries contact 29. The upper armature is pivotally mounted at one end on the upper end of the frame 43 and is biased by a spring 46 to a normally elevated position to hold the contacts 28 and 29 open until the coil is energized which draws the armature down against the core and closes line contacts 28 and 29.

The relay also has a conductive strip 47 anchored at one end to the base 41 which extends upwardly above the base at its free end to support contact 31. Contact 32 is supported on the base below contact 31. A depending rod 48 is mounted on upper armature 44 which carries an insulator member 49 on its lower end disposed above the strip 47 to move down against the strip to close the contacts 31 and 32 when the coil is energized.

Figure 5:
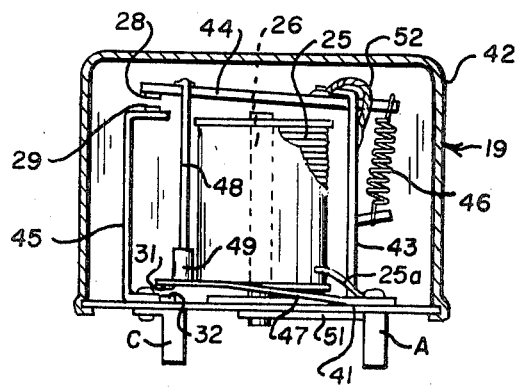
FIG. 5 is a side elevation view of the relay of FIG. 3.

The relay has four male connector terminals extending downwardly from its base 41 to facilitate its quick connection into the circuit. Connector terminal A connects to one side 25a of the coil and to the conductive strip 47. Connector terminal B is connected to the other side 25b of the coil and frame 43 to armature 44 through a connector bar 51 which extends along the underside of the base; the frame 43 and armature 44 being electrically connected together by a conductive wire 52 (FIG. 5). Connector terminal C is connected to contact 32 which is grounded in the circuit and connector terminal D is connected to member 45 supporting contact 29.

A particular embodiment of the control switch assembly 21 which is especially suited for mounting on the steering column of the vehicle or on the instrument panel at an easily accessible location is shown in more detail in FIGS. 7 through 10. The assembly shown comprises a channel-shaped body 55 for a conductive material closed at one end which is adapted to be fastened to the steering column 22 by screws 56 which extend through the body and through a resilient mount 57 and into the steering column 22. An upright clevis portion 58 forming an outer extension of the body is arranged to receive a pin 59 and a U-shaped member 61 is attached to the lever to support the lever 23 from the body for a backward and forward pivotal movement parallel to the steering column as indicated by arrows. The contacts 36 and 37 are provided by a generally L-shaped conductive member 62 which is secured to the bottom of the body and is suitably insulated therefrom by strips of insulator material. The conductive member 62 has a window 60 formed in its upstanding leg through which the inner end of the lever extends; this inner end forming the movable contact designated 24 of the switch lever. In this manner each side of the window will form the dual contact points 36 and 37 which require the inner end to make only a slight engagement to make contact. A resilient support member 63 is disposed between the sidewalls of the body adjacent its outer ends through which the inner end 24 of the lever extends; the inner end of the lever thereby forming a contact which is normally disposed in a central or neutral position in the window between the contacts 36 and 37 and the resiliency of member 63 will return the lever to this neutral position after the lever has been released. The lever 23 is shown grounded to the body 55 by a wire 64 so that the lever will ground the control switch when moved to either of the forward or rearward positions shown in dash lines in FIG. 8. This dual contact point construction facilitates an easy and quick actuation of the device by the driver once the brake has been applied.

The driver indicator bulb 38 is shown as supported in the body 55 by spaced upper and lower contacts 66 and 67. The upper contact 66 is insulated from the body 55 and will connect by a wire 65 to the live relay contact 29 while the lower contact 67 is connected directly to the body 55 which is grounded. A U-shaped removable cover member 68 sets over the top of the body 55 which has secured thereto by a screw-threaded fastener 69 to provide access to the interior parts of the switch and to replace the bulb 38 as required. A lens 35a is mounted on the cover which is illuminated when the inner light 38 turns on, to tell the driver his stop warning light 17 is on.

Figure 11:
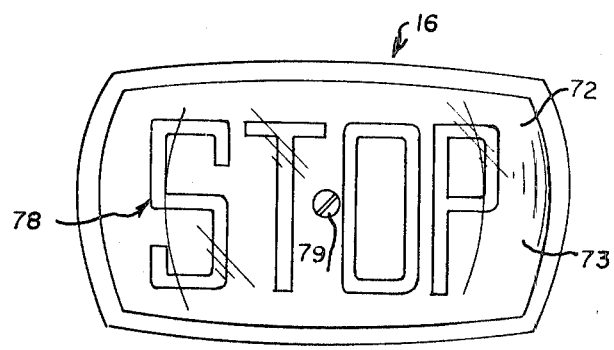
FIG. 11 is a rear elevation view of a typical stop-warning device.
Figure 12:
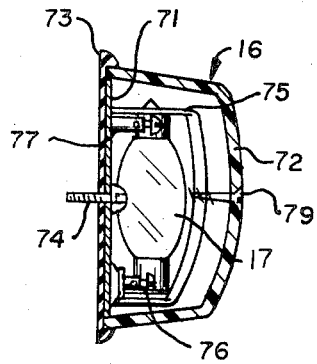
FIG. 12 is a side elevation view of the stop-warning member shown in FIG. 11 with the lens broken away to show interior parts.
Figure 13:
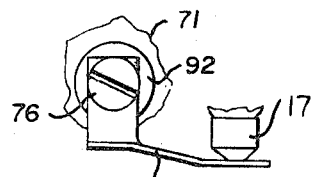
FIG. 13 is a fragmentary elevation view of the lower support for the lamp and a terminal associated therewith.
Figure 7:
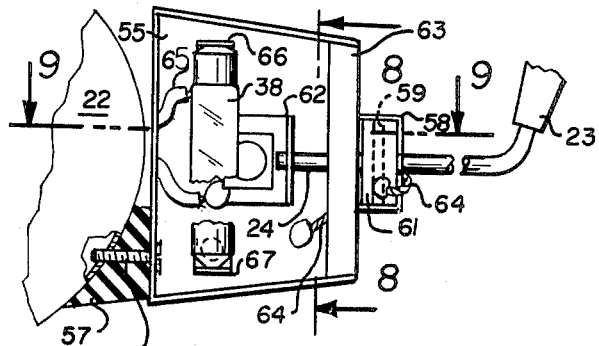
FIG. 7 is a side elevation view of a control switch assembly with the top cover removed to show interior parts.
Figure 8:
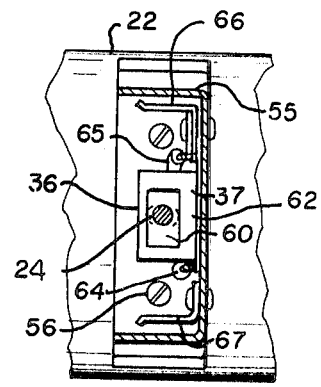
FIG. 8 is a sectional view taken along lines 8—8 of FIG. 7.
Figure 9:
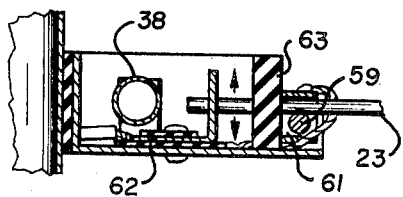
FIG. 9 is a sectional view taken along lines 9—9 of FIG. 8.
Figure 10:
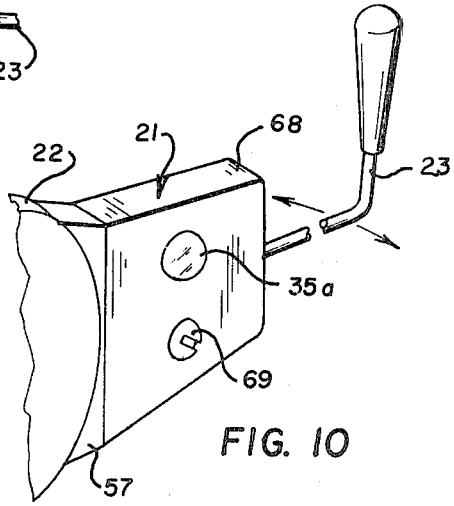
FIG. 10 is a perspective view of the control switch assembly of FIGS. 7, 8 and 9 with the top cover in place as mounted on the steering column.

A typical stop-warning element 16 is shown in FIGS. 11, 12 and 13 comprises a base or backing plate 71 on which is mounted a lens 72. This assembly may be used in combination with a rubber or polyvinyl chloride mounting gasket 73 to facilitate its attachment to the trunk of the vehicle or the like using suitable fasteners 74 such as screws. The lens is preferably of a plastic non transparent material preferably red for the rear with a graphic representation of the word "Stop" designated by numeral 78 formed therein. The word will be molded into the lens so as not to be visible until the bulb 17 is turned on. The lens is preferably detachably mounted through the backing plate as by a screw 79 threaded into the bulb socket support 75 to provide access to the interior parts. A front stop warning member would be similar to the rear which would have a white frosted nontransparent lens with the transparent lettering. An upper socket 75 for the stop-warning light bulb 17 is mounted on the plate 71 and there is provided a terminal 77 to ground this side of the bulb. The lower terminal for the bulb is a conductive support member 91 isolated from plate 71 by an insulator 92 with a terminal bolt 76 to connect it to this side of the assembly to the electric power.

The foregoing described device is designed so that it may be used with suitable vehicle voltages including 6, 12, 24 and 32 v. DC. The air gap between the contact points 36 and 37 and movable contact 24 is preferably about 0.030 inches. The rear stop light bulb is preferably on the order of 18 w. and the insulator material may be rubber, polyvinyl chloride and the like. The driver light bulbs may be on the order of 1 to 2.2 w.

Although the present invention has been described with a certain degree of particularity, it is understood that the present disclosure has been made only by way of example and that changes in details of structure and system components may be made without departing from the spirit thereof.

What Is Claimed Is:

1. A positive stop signal device for a vehicle having brakes and brake lights comprising:

a source of electric power, a stop-warning device operable independently of the brake lights for producing a positive stop-warning signal, first and second control means for selectively regulating the electric power to the stop-warning device, said first and second control means being independently operable relative to one another and both being required to be actuated to actuate said stop-warning device, said first control means including a brake-operated first control switch means operatively connected in a power circuit between said source and said stop-warning device, said second control means including a manually settable, automatically releasable, second control switch means and relay means operable in response to the momentary actuation of said second control switch means, said relay means being operatively arranged to prevent actuation of said stop-warning device until said first control switch means is actuated and for holding the power circuit in a state of actuation through said first control switch means after the second control switch, means automatically returns to an inactive position whereby the stop-warning device is actuated by said second control switch means only after the first control switch means is actuated and the stop-warning device automatically becomes deactuated when the brakes are released.

2. A positive stop signal device as set forth in claim 1 wherein said first control switch means includes a first normally open electric switch positioned to be actuated by the depression of the brake pedal and a second normally open electric switch positioned to be actuated by the setting of the hand brake lever on the vehicle, said first and second electric switches being connected in parallel to one another for actuation of the stop-warning device by either said brake pedal or said hand brake lever.

3. A positive stop signal device as set forth in claim 1 wherein said second control means includes a lever adapted to operate in an in and out parallel movement relative to a steering column of the vehicle.

4. A positive stop signal device as set forth in claim 1 wherein said stop-warning device includes a graphic display of the word "Stop" and an electric light source to illuminate the word only when the electric power source is electrically connected to the electric light source.

5. A positive stop signal device for a vehicle having brakes and brake lights comprising:

a source of electric power, a stop-warning device operable independently of the brake lights for producing a positive stop-warning signal, first and second control means for selectively regulating the electric power from said source to the stop-warning device, said first and second control means being independently operable relative to one another and both being required to be actuated to actuate said stop-warning device, said first control means including a brake-operated first control switch operatively connected in a power circuit between said source and said stop-warning device, said second control means including a manually settable, automatically releasable second control switch and a relay operable by the momentary actuation of said second control switch, said relay including a coil and first and second sets of normally open contacts, said first set of contacts being connected in said power circuit to prevent actuation of the stop-warning device until after said first control switch is actuated, said coil and second control switch being connected in a ground circuit for the soil leading from said source through the first control switch for holding the coil energized and thus remaining the power circuit, in a state of actuation through said first control switch after the second control switch returns to the inactive position whereby the stop-warning device is actuated only after the second control switch has first been actuated and the stop-warning device automatically becomes deactuated when the brakes are released.

6. A positive stop signal device as set forth in claim 5 wherein said second set of contacts are formed as an integral part of the relay with said coil and said first set of contacts.

7. A positive stop signal device as set forth in claim 5 wherein said stop-warning device includes a nontransparent lens member with transparent lettering forming the word "stop" and a light source arranged for only illuminating said lens member.

8. A positive stop signal device as set forth in claim 5 wherein said second control switch includes a resiliently mounted lever having an inner end portion formed of electric conductive material to provide one contact, said end portion being disposed within an electric conductive member in the form of a window which forms two other electric contacts electrically connected together on each side of said end portion of the lever.

9. A positive stop signal device as set forth in claim 8 wherein said lever is adapted to be mounted on the steering column of the vehicle to move backward and forward generally parallel thereto to make electric contact and close the contact switch in either a backward or forward position.

PO-1050
(5/69)

UNITED STATES PATENT OFFICE
CERTIFICATE OF CORRECTION

Patent No. 3,603,924    Dated September 7, 1971

Inventor(s)    Forest K. Harbert

It is certified that error appears in the above-identified patent and that said Letters Patent are hereby corrected as shown below:

Column 2, line 31, "level" should read --lever--

Column 6, line 18, "soil" should read --coil--; line 20, "remaining" should read --maintaining--; line 21, after "circuit" the comma should be deleted.

Signed and sealed this 4th day of April 1972.

(SEAL)
Attest:

EDWARD M.FLETCHER,JR.                ROBERT GOTTSCHALK
Attesting Officer                    Commissioner of Patents